United States Patent
Meyer (10) Patent No.: US 7,280,681 B2
(45) Date of Patent: Oct. 9, 2007

(54) METHOD AND APPARATUS FOR GENERATING A COMBINED PARAMETER MAP

(75) Inventor: Heiko Meyer, Dornitz (DE)

(73) Assignee: Siemens Aktiengesellschaft, Munich (DE)

( * ) Notice: Subject to any disclaimer, the term of this patent is extended or adjusted under 35 U.S.C. 154(b) by 824 days.

(21) Appl. No.: 10/454,569

(22) Filed: Jun. 4, 2003

(65) Prior Publication Data
US 2003/0223628 A1 Dec. 4, 2003

(30) Foreign Application Priority Data
Jun. 4, 2002 (DE) .................. 102 24 756

(51) Int. Cl.
*G06K 9/00* (2006.01)
(52) U.S. Cl. ....................... 382/128; 348/34
(58) Field of Classification Search ........ 382/128, 382/131, 132; 348/32–34
See application file for complete search history.

(56) References Cited

U.S. PATENT DOCUMENTS

| | | | | |
|---|---|---|---|---|
| 4,149,185 A | * | 4/1979 | Weinger | 348/34 |
| 4,690,150 A | * | 9/1987 | Mayo, Jr. | 600/440 |
| 4,789,831 A | * | 12/1988 | Mayo, Jr. | 324/309 |
| 5,146,346 A | * | 9/1992 | Knoll | 382/167 |
| 5,182,639 A | * | 1/1993 | Jutamulia et al. | 348/32 |
| 5,332,968 A | * | 7/1994 | Brown | 324/309 |
| 5,410,250 A | * | 4/1995 | Brown | 324/309 |
| 5,488,297 A | * | 1/1996 | Nakada | 324/309 |
| 6,501,826 B1 | | 12/2002 | Kropfeld | |
| 6,956,373 B1 | * | 10/2005 | Brown et al. | 324/309 |

FOREIGN PATENT DOCUMENTS

| DE | OS 38 03 893 | 8/1989 |
|---|---|---|
| EP | 0 447 197 | 9/1991 |

OTHER PUBLICATIONS

"Integrated Displays of Multiparameter and Multimodality Images," Pickett et al., IEEE Proc. Vis. Biomed. Comp. (1990), pp. 58-65.

* cited by examiner

*Primary Examiner*—Bhavesh M Mehta
*Assistant Examiner*—Christopher Lavin
(74) *Attorney, Agent, or Firm*—Schiff Hardin LLP (57) ABSTRACT

In a method and apparatus for generating a combined parameter map from a number of individual, initial parameter maps that contain values of various parameters dependent on the position (x, y), for each of the initial parameter maps and for each position, the signal value of the parameter at the appertaining position is converted into a first color value according to a first transfer function specifically defined for the respective parameter. Subsequently, the first color values are respectively converted into color code intensity values on the basis of a second transfer function. The color code intensity values of the individual parameters are then operated to form a combined intensity value. Finally, the combined intensity value is converted with a third transfer function into a color value at the appertaining position in the parameter map.

22 Claims, 5 Drawing Sheets

METHOD AND APPARATUS FOR GENERATING A COMBINED PARAMETER MAP

BACKGROUND OF THE INVENTION

1. Field of the Invention

The present invention is directed to a method for generating a combined parameter map from a number of individual, initial parameter maps that contain values of various parameters dependent on the position. The invention also is directed to a corresponding apparatus for generating such a combined parameter map.

2. Description of the Prior Art

In an examination of a subject, for example a person or a body part or organ of a person, with an imaging modality, for example with an X-ray device, a computed tomography system, a magnetic resonance tomography system or a sonography device, physical and/or physiological parameters can be obtained from an individual image or from a series of images in addition to the presentation of purely anatomical information. Typical examples of such parameters in an examination supported by contrast agent are the time curve or the maximum value of the contrast agent concentration in specific regions of an examined organ. A signal value can be determined for every individual picture element from the image or image sequence for each parameter of interest, and a parameter map thus can be generated for each of the parameters. For the presentation of the parameter map, the identified values usually are converted into an intensity value with a specific value range, for example between 0 and 4095. This intensity value then can be encoded in a grayscale or color scale for presentation, so that a black-and-white parameter map with various gray gradations or a chromatic parameter map arises.

In many instances, however, a dependable diagnosis is only possible when the behavior of the regions under examination in the examination is observed with respect to various parameters. Thus, for example, an unusual behavior with respect to one parameter can elicit the suspicion that a malignant lesion could be present in the appertaining region of the examination subject. In order to confirm or dispel the suspicion, the behavior of the suspicious region with respect to other parameters must be known. In order to arrive at a dependable conclusion, the examination personnel consequently must monitor a number of parameter maps simultaneously, with subjective perceptions of the examination personnel entering into consideration in borderline cases. A combination of the parameters in a parameter map therefore would facilitate the evaluation of the information.

Conventionally only the possibility of combining a maximum of two parameters in a parameter map has existed, i.e. a combined parameter map can be generated from a maximum of two "initial parameter maps" each respectively representing the values for one parameter with the values of one of the parameters being encoded as color values and the values of the other parameter being encoded as brightness values. A combination of an arbitrary number of different parameters in a single parameter map is not possible with this method.

SUMMARY OF THE INVENTION

An object of the present invention is to provide a method and apparatus that allow a combination of arbitrarily many different initial parameter maps to form a combined parameter map.

This object is achieved in accordance with the invention in a method and an apparatus wherein, each of the initial parameter maps and for each position in the parameter map, i.e. for each individual map pixel or for each voxel given a three-dimensional presentation, the signal value of the appertaining parameter present at the appertaining position is first converted into a first color value according to a parameter-dependent, first transfer function, i.e. a first transfer function that is specifically defined for the respective parameter. Subsequently, this first color value is respectively converted into a "color code intensity value" on the basis of a second transfer function. The color code intensity values of the individual parameters are then operated on according to a prescribed operational rule to form a combined intensity value. Finally, the combined intensity value is converted with a third transfer function into a color value for presentation at the appropriate position in the parameter map.

The color values are, for example, values referred to as "RGB values" that contain a red component, a green component and a blue component or other, comparable representations of colors. The transfer functions respectively convert a scalar value, for example an arbitrary signal value or intensity value, into the color value. A color reference table (color look-up table) that, for example, contains fields for the various color components, for example red, green and blue, is employed. Scalar intensity values in a specific value range can serve as indices for the fields within the look-up table. A more detailed explanation of such transfer functions for the conversion of a scalar intensity value into a color value can be found, for example, in the book by Will Schröder, The Visualization Toolkit, Prentice Hall PTR, New Jersey, 1998, pp. 956 through 928. If an identified signal value is not present in the form of an intensity value within the defined value range, a conversion of the signal value into the suitable intensity value, and vice versa, occur in a simple way. In this way, an arbitrary transformation can be implemented back and forth between an identified, scalar signal value and a color value.

The conversion of the signal values of the initial parameter maps into a first color value using a transfer function individually defined for the parameter that is first inventively implemented ensures that the information contained in the signal values are respectively represented by colors suiting one another with respect to the desired examination and the following operation rule. For example, the value range of a parameter that indicates a specific property of the examination subject is presented by the same color or at least the same color range with which the value range of a different parameter that indicates the same property is also presented. This assures that the information contained in the parameters is emphasized in the following operation and that no information will be canceled.

The following back-transformation then assures the signal value is converted back into a scalar value, the color code intensity value. The signal value of a parameter is represented by the color code intensity value within a color selection prescribed by the respective, first transfer function of the appertaining parameter. Since the color code intensity values are scalar values, an arbitrary, simple mathematical operation of the values is possible, for example the formation of an average, a simple summing, etc. An arbitrary, second transfer function, for example a customary standard transfer function that converts the RGB values into a scalar value between 0 and 4095, can be employed for the back-transformation of the color values into the color code intensity values. The same second transfer function preferably is employed for all parameters.

The combined intensity value is then converted back into a color value with a third transfer function. This color value is ultimately presented in the parameter map. This third transfer function also can be arbitrarily selected and, for example, freely defined by the user.

The following basic components are an inventive apparatus for generating such a combined parameter map from a number of individual, initial parameter maps containing the values of various parameters dependent on the position:

A unit for the reception and/or for fetching the initial parameter maps of the various parameters from a memory.

A transfer unit converts the signal value of the parameter present at the appertaining position into a first color value according to a first transfer function defined for the respective parameter for each position for each of the initial parameter maps.

A transfer unit to convert the first color value for each position for each of the initial parameter maps into a color code intensity value on the basis of a second transformation.

An operation unit to operate on the color code intensity values of the individual cards for each position into a combined intensity value.

A transfer unit to convert the combined intensity value for each position into a color value by means of a third transfer function.

An output unit for the output of and/or storage of the combined parameter map.

Such an apparatus preferably is realized in the form of software, for example on a computer of a conventional image evaluation device, in which the initial parameter maps also have been generated from the acquired images or image sequences. The transfer units can be respectively implemented as software modules, for example as sub-routines, which are called in a suitable sequence by a higher-ranking program. The transfer software modules respectively operate according to the transfer functions that, for example, are stored in a memory or are defined, for example, by the user during the program execution.

In one realization of the inventive apparatus in the form of software, it is possible to retrofit image evaluation devices of existing, conventional X-ray devices, computed tomography systems, magnetic resonance tomography systems etc., such that work can be performed according to the inventive method with these devices.

An arbitrary operational rule suitable for the particular case can be selected for the operation of the individual color code intensity values of the various parameters to form a combined intensity value. In a preferred exemplary embodiment, this operation is an averaging of the color code intensity values.

In the operation, moreover, the color code intensity values of the various parameters can be weighted with a weighting coefficient defined for the appertaining parameter. The extent to which a specific parameter enters into the combined parameter map is thus defined. The weighting coefficients can be permanently prescribed for specific examinations. They can, however, also be freely selected by the user.

In the case of an operation by taking an average, for example, the weighted average of the individual color code intensity values is thereby formed. To this end, the color code intensity values can first be multiplied by the defined weighting coefficients, and the color code intensity values weighted in this way can be added. The sum of the weighted color code intensity values is divided by the sum of the weighting coefficients.

In order to implement this method in this way, the operational unit of the inventive apparatus preferably includes a calculating unit for forming the average, for example also in the form of a software sub-routine. The operational unit can also include a unit for weighting the color code intensity values, and an input unit so that the user can define the weighting coefficients.

As an alternative or in addition to a weighting of the individual color code intensity values in the operation, a weighting also can be realized suitable different second transfer functions being selected for the various initial parameter maps in the conversion of the first color values into the color code intensity values.

For defining the first transfer functions for the individual parameters, a color value can be assigned to each signal value with a value range of the appertaining parameter and stored, for example, in a look-up table. The determination of the parameter-dependent, individual transfer functions can be defined by the user, i.e. each user defines the form and the way in which the signal values are transformed into specific color values. It is also possible to automatically implement such an allocation dependent on the respective parameter as well as on the type of examination.

A preferred technique for generating a user-defined transfer function is to assign specific color values to specific signal values, the specific color values then serving as supporting points for a further allocation of the remaining signal values and color values to one another. I.e., The allocation of the signal values lying between the signals values defined by the user and the color values lying between the appertaining color values ensues automatically. Preferably an interpolation method is used for this purpose, with arbitrary interpolation methods known those skilled in the art being suitable.

The inventive apparatus includes an allocation unit for this purpose that, for example, has an input unit with which the user can assign specific color values to specific signal values. Moreover, the allocation unit includes means, for example in the form of a corresponding software routine, to automatically allocate the signal values to one another and color values that lie between the "supporting points" defined by the user.

In an especially user-friendly exemplary embodiment, the allocation unit has a graphic user interface on which a value range of the appertaining parameter is displayed and on which a color curve is additionally presented, preferably immediately next to the value range. The allocation unit also includes an input for the allocation of the values of the displayed value range to the colors of the displayed color curve.

The displayed color curve can proceed through a number of color ranges. The input unit is preferably fashioned to allow the user to assign the color ranges of the color curve to a displayed value range section-by-section. This is possible, for example, by the user activating specific regions or color values of the color curve with a marking element, for example a cursor, arrow or the like, controlled by a mouse, a joystick or a similar control element, to displace regions or values relative to the juxtaposed signal values of the value range, and thereby allocating specific, displayed values to specific colors. Alternatively, the user can adjust the value range using the keyboard or a mouse pointer or the like. Thus, it is also possible for the user to modify the value range and/or the color curve—at least in sections—with the input units.

A typical example of this is a color curve that proceeds from black into red via blue, green, yellow, orange, and the user can arbitrarily compress or stretch either the entire color curve or individual regions. For example, the user can generate a color scale therefrom that first has a relatively short black region, then a relatively long blue region, a relatively short transitions from green into yellow, with orange and red being present above a threshold of the value range that the user selects.

In a preferred exemplary embodiment, the user can also freely define the third transfer function in the same way, preferably likewise via the graphic user interface, in order to obtain an optimum presentation of the combined parameter map. A definition of a common, second transfer function or a number of different second transfer functions for the various initial parameter maps likewise can ensue in a similar way.

With the invention, thus, a result map can be calculated overall from arbitrary parameters, the colors in the result map representing specific values that were generated according to a combination of all parameters prescribed for the respective examination by the user or automatically. Consequently, suspect regions can be marked as a specific color, for example red, and non-suspect regions can be marked as a contrasting color, for example green through blue. An overlay of the map on an anatomical image then allows a fast allocation to a specific anatomical region and a final diagnosis. An analysis of a number of different parameter maps is unnecessary.

DESCRIPTION OF THE PREFERRED EMBODIMENTS

Figure 1:
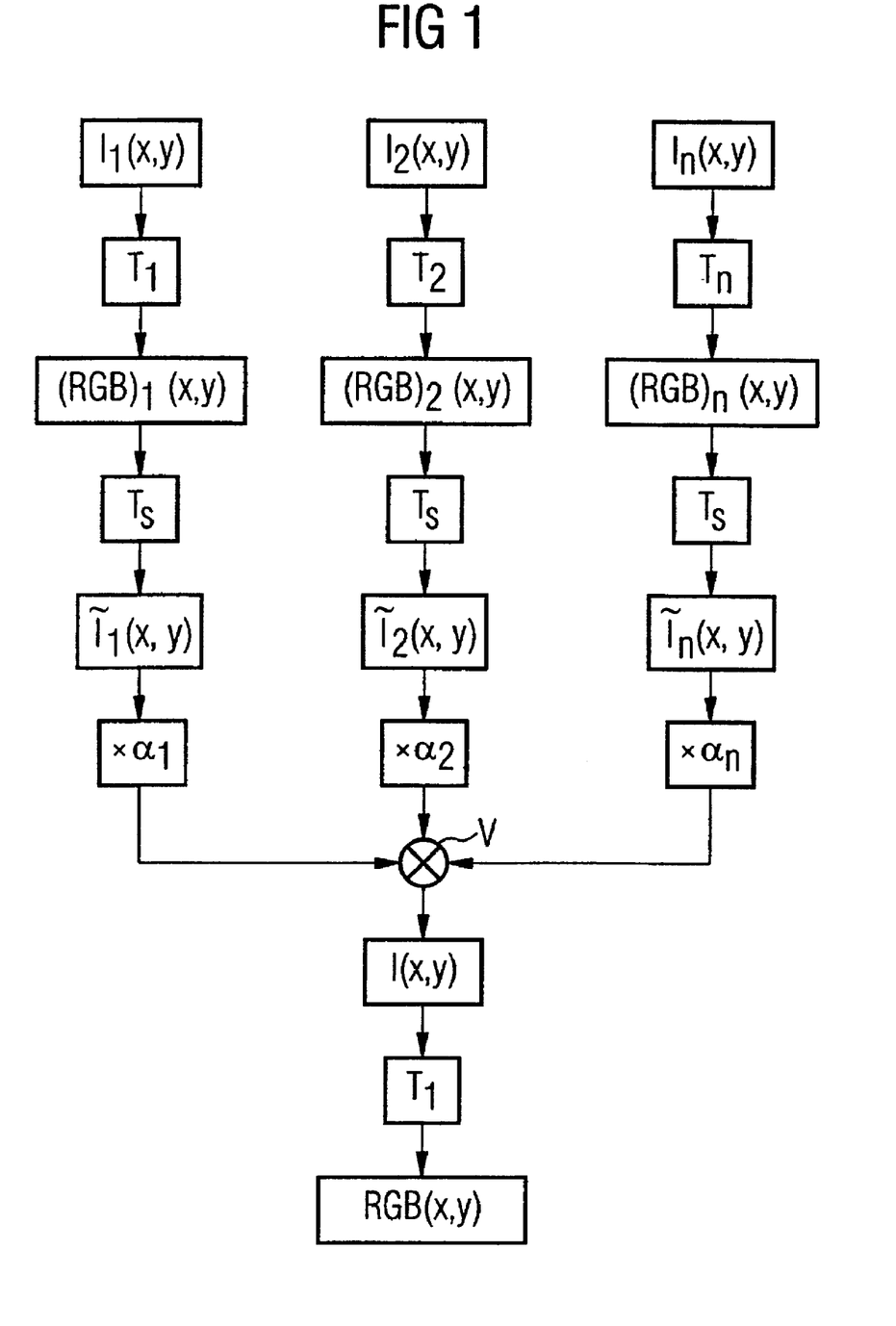
FIG. 1 is a flowchart of an exemplary method execution for calculating a combined parameter map in accordance with the invention.

For clarity, FIG. 1 shows only the inventive method with reference to the example of a combination of three different parameters within a two-dimensional parameter map, however, it is unproblemmatically possible to combine an arbitrary number of different parameters in a parameter map with the method. Moreover, the inventive method also can be employed without further difficulty for parameter maps in three-dimensional space. For a better presentation, however, the exemplary embodiment refers only to the two-dimensional case. FIG. 1, moreover, only shows the method for the calculation of a color value at a specific position, i.e. a specific pixel of the parameter map, which is represented here by the two position coordinates x and y. For generating the overall, combined parameter map, the method is separately implemented for each position x and y. The positional dependency is indicated by the addition (x, y) in FIG. 1. Because of the shorter notation, however, this addition is usually foregone below.

The input values are the respective signal values $I_1$, $I_2$, $I_n$ determined for the individual parameters. These signal values $I_1$, $I_2$, $I_n$ are then transferred into respective color values $RGB_1$, $RGB_2$, $RGB_n$ with transfer functions $T_1$, $T_2$, $T_n$ specifically defined by the user for the respective parameters.

In a further step, the individual color values $RGB_1$, $RGB_2$, $RGB_n$ are then converted into a color code intensity value $\tilde{I}_1$, $\tilde{I}_2$, $\tilde{I}_n$ by means of a standard transfer function $T_s$. The color code intensity values $\tilde{I}_1$, $\tilde{I}_2$, $\tilde{I}_n$ are scalar values between 0 and 4095. They respectively represent the color value $RGB_1$, $RGB_2$, $RGB_n$ within this value range that was generated by the transformation of the original signal value $I_1$, $I_2$, $I_n$ by means of the first transfer function $T_1$, $T_2$, $T_n$.

The transfer functions $T_1$, $T_2$, $T_n$ are stored in the form of a look-up table. The standard transfer function $T_s$ is likewise realized by a standard look-up table that converts arbitrary RGB values into a scalar value.

The operation of the individual color code intensity values $\tilde{I}_1$, $\tilde{I}_2$, $\tilde{I}_n$ then ensues by means of the following equation:

$$I(x, y) = \frac{\sum_{i=1}^{n} \alpha_i \cdot \tilde{I}_i(x, y)}{\sum_{i=1}^{n} \alpha_i} \quad (1)$$

$I(x, y)$ is the signal intensity of the pixel in the result map, i.e. the combined parameter map, at the position x, y, $\alpha_i$ are arbitrary weighting coefficients that typically lie between 0 and 1, and $\tilde{I}_i (x, y)$ indicates the color code intensity value for an individual parameter i=1 through n at the position x, y.

This operation is shown in FIG. 1 such that the individual color code intensity values $\tilde{I}_1$, $\tilde{I}_2$, $\tilde{I}_n$ are first multiplied by the respective weighting coefficients $\alpha_1$, $\alpha_2$, $\alpha_n$ in a multiplication step. The summing of the weighted color code intensity values and the division by the sum of the weighting coefficients $\alpha_1$, $\alpha_2$, $\alpha_n$ according to Equation (1) ensue subsequently in the operation step V. The signal intensity $I(x, y)$ of the respective pixel in the combined parameter map is ultimately obtained as result. For presentation in the map at the position x, y, this is then converted into a color value $RGB(x, y)$ with a customary transfer function $T_I$ that likewise can be defined by the user and deposited in a look-up table.

Figure 2:
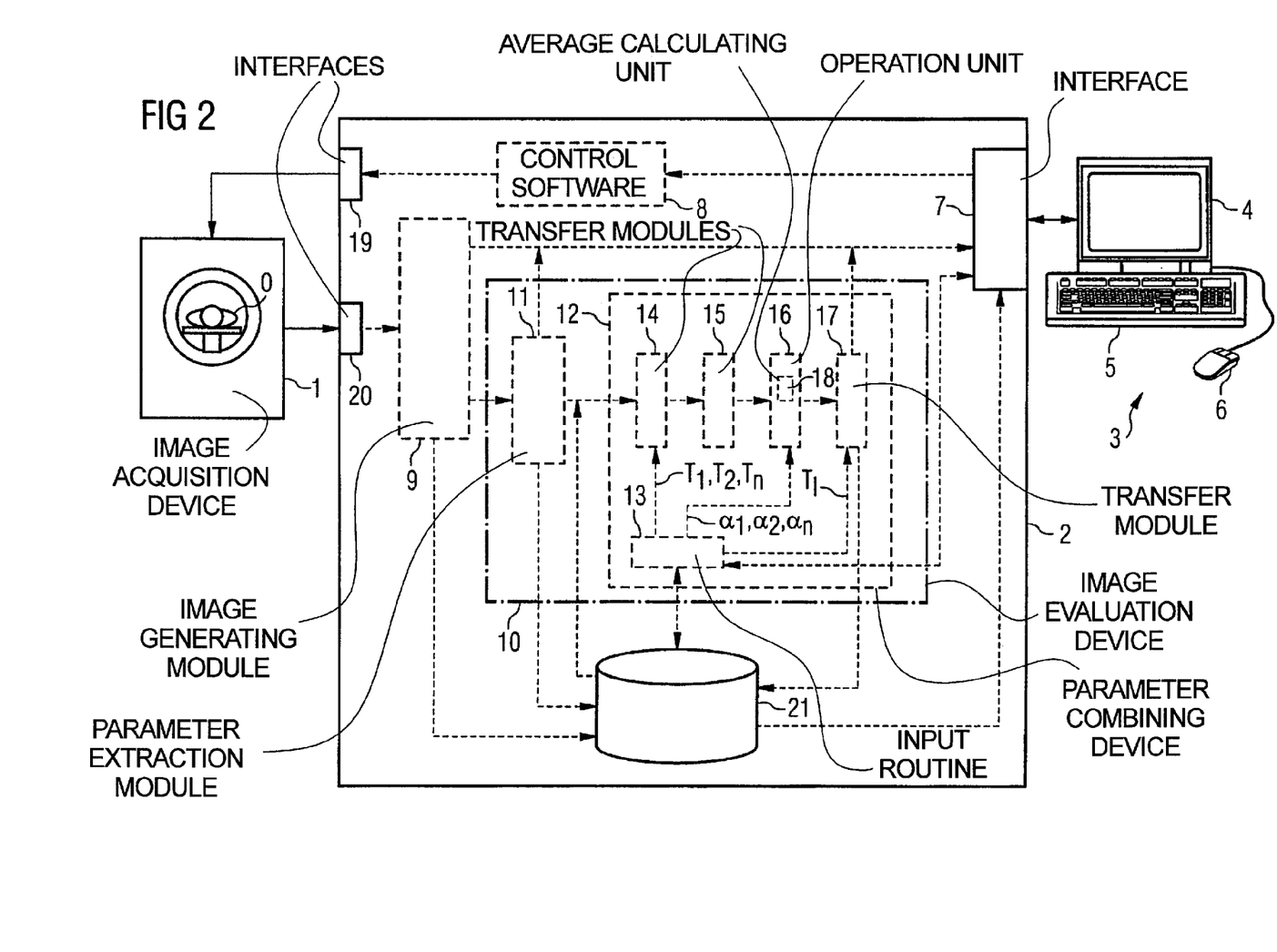
FIG. 2 is a schematic illustration of an inventive apparatus.

FIG. 2 shows an image acquisition device 1, for example a nuclear magnetic resonance tomography system 1 for making tomograms of a subject O, a patient in this case. The magnetic resonance tomography system 1 is operated by a control unit 2.

The control unit 2 is essentially formed by a computer 2 that has suitable interfaces 19, 20 for connection to the magnetic resonance tomography system 1 as well as an interface 7 to a terminal for the operation of the control unit 2 by a user. The control unit 2 also is equipped with a bulk storage 21 for storing images, transfer functions, etc. Here, the storage 21 is arranged within the control unit 2; however, it can also be connected to the computer of the control unit 2 via a corresponding interface as an external storage.

Suitable software for the operation of the image acquisition device 1 is implemented, on the computer of the control unit 2 and is shown here in the form of a block 8. Using this control software, a user can operate the image acquisition device 1 via the terminal 3 such that the desired images are produced and, for example, an image sequence is generated from which the values for the individual parameters can then be extracted for generating the initial parameter maps.

The generated image data are handed over from the image acquisition device 1 via the interface 20 to an image-generating software module 9 that compiles the image data into an image and outputs the image for the user via, for example, the interface 7 to a picture screen 4 of the terminal 3 or stores it in the storage 21.

The control unit 2 also has an image evaluation device 10 in the form of a software module implemented on the computer. This in turn has a first parameter extraction module 11 that extracts the parameters or the values for the parameters at the respective position from the images generated by the image-generating module 9 and thus generates a parameter map. Instead of being directly taken from the image-generating module 9, alternatively, the initial or base images for this can also be taken from the storage 21 in which the image-generating module 9 previously stored the appertaining images. The parameter maps generated in the parameter extraction module 9, which can represent only a single parameter, can then likewise be directly displayed on the picture screen via the interface 7 or can in turn be deposited in the storage 21.

Inventively, the image evaluation device 10 has a parameter-combining device 12 that operates the data from the various parameter maps to form a combined parameter map. The initial parameter maps can be directly taken from the parameter extraction module 11 or can be called from the storage 21. The inventive parameter-combining device 12 is a sub-routine of the software forming the image evaluation device 10. As first component, this parameter-combining device 12 has a transfer module 14 that accepts the incoming data of the individual parameter maps and converts each of the individual signal values $I_1$, $I_2$, $I_n$ at each position (x, y) into a color value $RGB_1$, $RGB_2$, $RGB_n$ according to the first transfer function $T_1$, $T_2$, $T_n$ prescribed for the respective parameter.

The first transfer module 14 receives the transfer function $T_1$, $T_2$, $T_n$ needed for this from an input routine 13, with which the user can define the transfer functions $T_1$, $T_2$, $T_n$ via the terminal 3 in the method described below. This input routine 13 also is connected to the storage 21 in order to deposit or fetch transfer functions that have already been defined.

The color values $RGB_1$, $RGB_2$, $RGB_n$ are then handed over to a further transfer module 15 that transfers the color values $RGB_1$, $RGB_2$, $RGB_n$ into the color code intensity values $\tilde{I}_1$, $\tilde{I}_2$, $\tilde{I}_n$ according to a standard transfer function $T_s$. These values are then handed over to an operation unit 16, also in the form of a software module, that calculates the weighted average according to Equation (1) in an average-calculating unit 18—likewise in the form of a sub-routine here. With the terminal 3, the user can prescribe the weighting coefficients $\alpha_1$, $\alpha_2$, $\alpha_n$ via the input routine 13.

In a further, third transfer module 17, the combined intensity values I for each position are converted into color values RGB that can then be displayed on the picture screen 4 of the terminal as parameter map or stored in the storage 21.

Via the terminal 3, moreover, images or parameter maps that already have been stored can be retrieved from the storage 21 with the interface 7 at any point in time.

Of course, the computer of the control unit 2 includes all other software and hardware components that are usually contained in a computer serving as control unit 2, for example an operating system, one or more processors on which the illustrated programs run as well as suitable, further memories and buffer memories. The computer can also has a connection to a printer or the like for the permanent output of generated images and/or parameter maps. The exact fashioning of these components, however, is not critical to the invention. These components therefore have not been shown in FIG. 2 for clarity.

Figure 3:
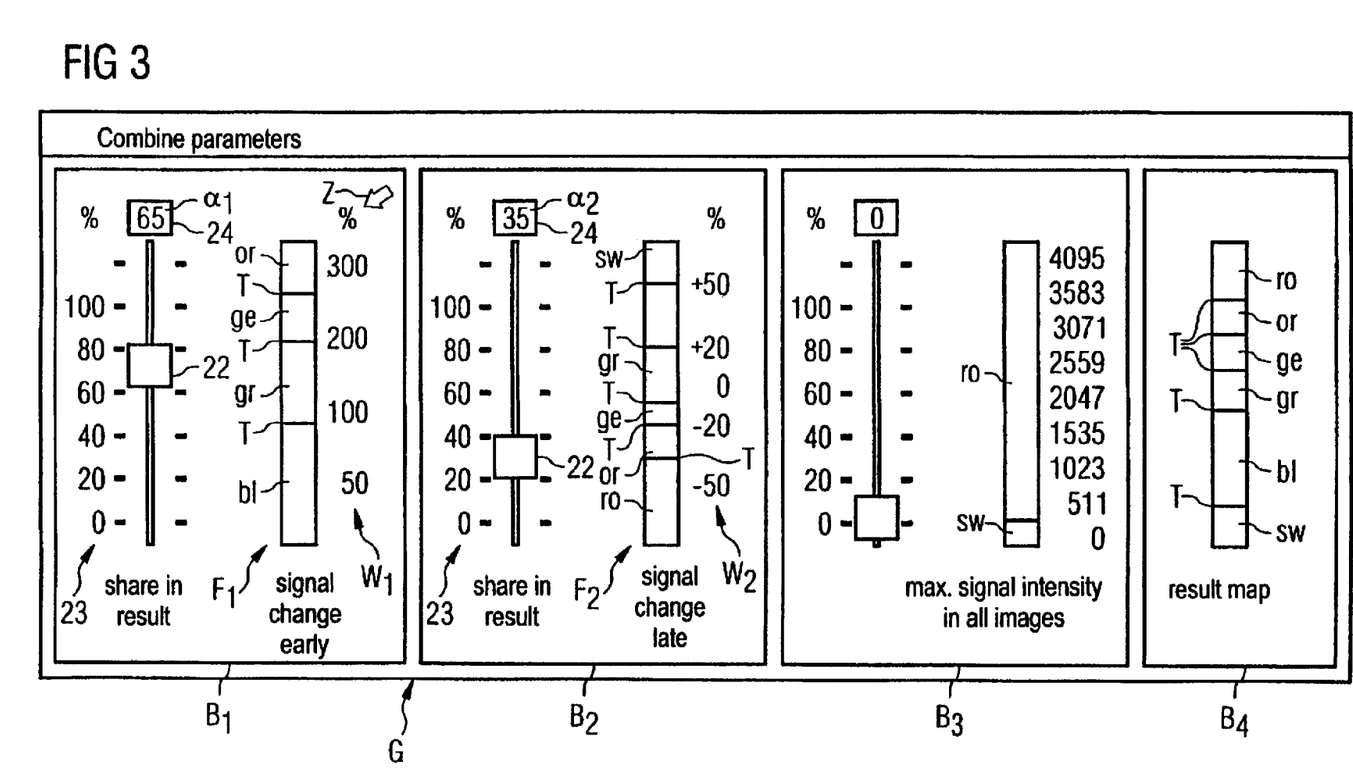
FIG. 3 is an illustration of a graphic user interface for generating the user-defined transfer functions and for entering weighting coefficients in accordance with the invention.

The definition of the first transfer functions $T_1$, $T_2$, $T_n$ for the individual parameters as well as the input of the weighting coefficients $\alpha_1$, $\alpha_2$, $\alpha_n$ ensues with a graphic user interface G that is displayed on the picture screen 4 of the terminal 3. FIG. 3 shows an example of such a graphic user interface G.

Here, the graphic user interface G has different operating regions $B_1$, $B_2$, $B_3$ in order to set the weighting coefficients $\alpha_1$, $\alpha_2$, $\alpha_n$ and the transfer functions $T_1$, $T_2$, $T_n$ for three different parameters. A further operating region $B_4$ is available in order to set the third transfer function T, on the basis of which the color values RGB are set for the combined intensity values I of the result map, i.e. of the combined parameter map.

The first operating region $B_1$ is located at the far left on the graphic user interface, the left half of the region $B_1$ having a first scale 23 with a simulated slider 22 via which the weighting coefficient $\alpha_1$ for the first parameter is set. The setting of the slider 22 ensues in that a pointer Z is moved on the slider 22 with the mouse 6 and the slider 22 is activated by clicking on it with a mouse key. When the pointer Z is then vertically displaced on the slider 22 with the mouse key pressed, the illustrated slider 22 is correspondingly adjusted and the weighting coefficient $\alpha_1$ is set as a result. The currently set weighting coefficient $\alpha_1$ is displayed in % in a display window 24 above the slider 22. Alternatively, it is possible to define the weighting coefficient $\alpha_1$ directly via a numerical input at the keyboard 5. True slide controls, rotary controls or the like with which the weighting coefficients can be set can likewise be provided as hardware.

A color curve $F_1$ for defining the first transfer function $T_1$ for the first parameter is shown in the right half of the first operating region $B_1$, at the right next to the slider 22. A scale for the value range $W_1$ in which the signal values of the appertaining parameter lie is located to the right thereof. In this exemplary embodiment, the value range extends from 0 through 300%. The scale of the value range $W_1$ is permanently set in this exemplary embodiment. For example, the user can numerically define the value range via the keyboard 5.

The user can modify the color curve $F_1$ using the mouse 6 and the mouse pointer Z. Here, the color curve $F_1$ proceeds from below via a blue color region bl through a green color region gr and a yellow color region gl into an orange-colored color region or. The user, using the mouse pointer Z, can adjust the widths of the individual color regions bl, gr, gl, or at the boundary lines T (shown as black bars in this exemplary embodiment) between the individual color regions bl, gr, gl, or by moving the pointer Z onto or into the proximity of the respective boundary line T and the pointer Z is then moved vertically with the mouse key pressed, and thus the boundary lines T are shifted. The entire color scale can also be modified in terms of its absolute length in the same way. Using the mouse pointer Z, moreover, the color curve $F_1$ can be displaced parallel to the juxtaposed value range $W_1$ without varying the relative relationships of the individual color regions bl, gr, gl, or to one another.

The color curve F1 also can be rotated by 180° by means of a corresponding input with the keyboard, so that, for example, the color curve has a red region at the bottom and then proceeds into blue or black. The identification of the boundary line T with black bars is not compulsory in a real graphic user interface on a terminal. They have been used in FIG. 3 merely fur illustrative purposes.

The input routine 13 acquires a shifting of the boundary lines T between the individual color regions bl, gr, gl, or as a user-defined allocation of the color values lying at the boundary lines T to specific signal values of the appertaining parameter. The further color values or signal values lying between these allocated color value/signal value pairs are automatically suitably allocated to one another, for example with an interpolation method. For the user, this gives the user the impression of being able to arbitrarily compress, stretch and shift the individual color regions with the assistance of the mouse and pointer.

A further operating region $B_2$ for the second parameter adjoins the first operating region $B_1$ at the right. The left half of this operating region $B_2$ also has a scale 23 having a simulated slider 22 lying to the right thereof and a display region 24 situated above it. The weighting coefficient $\alpha_1$ for the second parameter is set with these elements. A color curve $F_2$ with a value range $W_2$ for defining the first transfer function $T_2$ for the second parameter is also situated in the right half of this operating region $B_2$. In reverse direction compared to the color curve $F_1$ for the first parameter, for example, the color curve $F_2$ first has a red color region ro at the bottom and then proceeds via a color region orange or, into a yellow color region ge and then, further, into a green color region gr, into a blue color region bl as well as, finally, into a black color region sw. The value range $W_2$ for the second parameter proceeds from approximately −70% through +70%.

The operating region $B_2$ for the second parameter is adjoined by a further operating region $B_3$ of the graphic user interface G that in turn has a scale with a slider for setting the weighting coefficient for the third parameter as well as a further color curve and a value range for setting the first transfer function for a third parameter. In the illustrated exemplary embodiment, the setting is such that only two parameters are combined with one another, and the settings of the third operating region $B_3$ therefore do not take effect.

Situated at the far right, finally, is a further operating region $B_4$ with which the user can define the third transfer function T. As in the case of the other color curves $F_1$, $F_2$, this ensues by modifying the individual color regions sw, bl, gr, gl, or, ro with the mouse pointer Z.

Fundamentally, the graphic user interface can have more operating regions in order to combine more than three different parameter maps.

A typical applied example for a use of the invention is a contrast agent-assisted magnetic resonance breast imaging. In such an examination, benign and malignant lesions can be differentiated by the shape of the temporal intensity curve that indicates the contrast agent concentration in the tissue at a specific position.

Two parameters thereby play roles. The first parameter is the amplitude or level of the relative signal rise in an early phase, i.e., for example, in the first one to two minutes after the administration of the contrast agent. This parameter provides information about how fast the contrast agent accumulates at the appertaining position in the tissue under examination. The second parameter is the relative signal change in the later phase, i.e., for example, five to seven minutes after the administration of the contrast agent.

Figure 4:
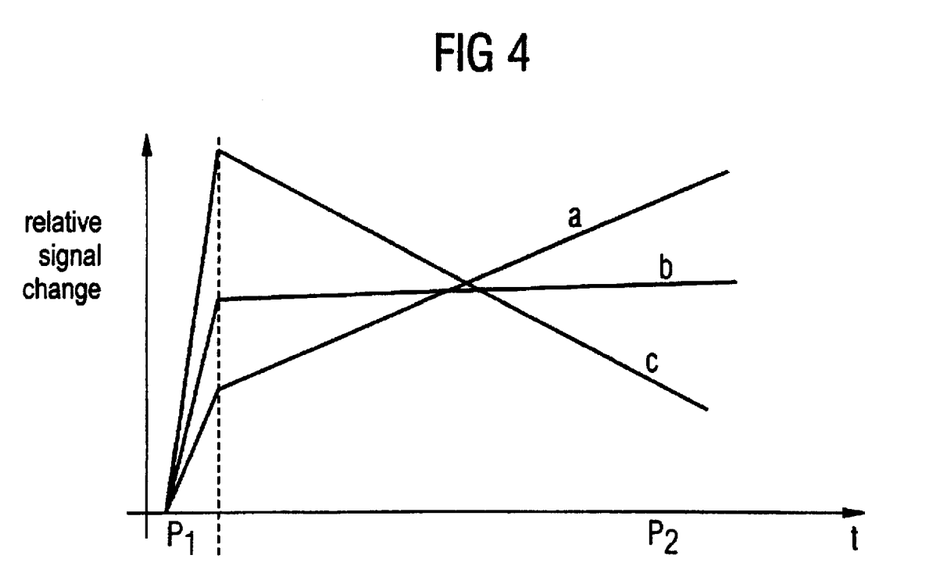
FIG. 4 is an illustration of exemplary time curves of a contrast agent concentration in different tissue.

FIG. 4 shows a diagram with three typical signal curves. The first signal curve 'a' shows a relatively weak rise of the signal in the first phase $P_1$ as well as a further signal rise in the second phase $P_2$—even though somewhat less than in the first phase $P_1$. Such a signal curve 'a' is obtained in the case of lesions that are quite certain to be benign. The second signal curve 'b' exhibits a more pronounced signal rise in the early phase $P_1$ than the benign signal curve 'a' and exhibits a nearly constant signal in the second phase $P_2$. This is probably represents a malignant lesion. The third signal curve 'c', in contrast, occurs given lesions that are quite certain to be malignant. Here, the greatest signal rise occurs in the early phase $P_1$ and a relatively pronounced drop in the signal subsequently occurs in the second phase $P_2$.

Two parameter maps are generally produced in order to characterize the course of the curve for a diagnosis. In one of the parameter maps, the signal intensity is proportional to the height of the relative signal rise in the first phase $P_1$. In the second parameter map, the signal intensity is proportional to the signal drop-off in the second phase $P_2$. A malignant tumor can be assumed with certainty only at the positions where high values occur in both maps. This is conventionally determined by means of an optical comparison of the parameter maps.

Figure 5A:
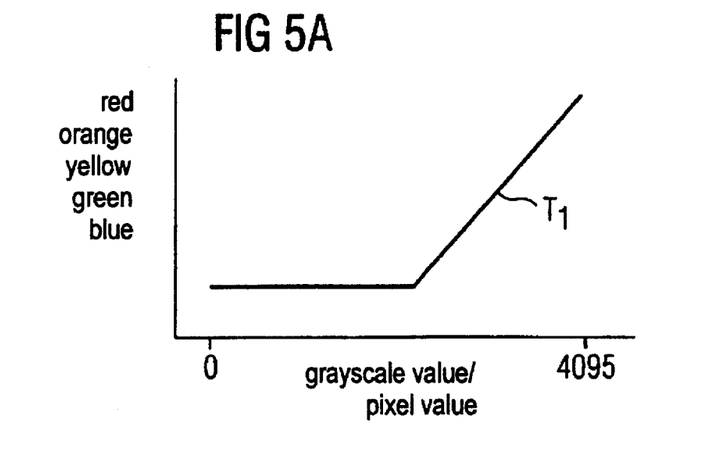
FIG. 5a is an example of a user-defined, first transfer function for a first parameter in accordance with the invention.

A combined parameter map in which a high signal intensity is directly correlated with the course of the curve is calculated from the two-parameter maps with the invention. To this end, the parameter-dependent, first transfer functions $T_1$, $T_2$ are correspondingly set such that a high rise in the first phase $P_1$ is allocated to a specific color region, for example orange or red, in contrast whereto a low rise in the first phase is more likely to lie in a blue or green region. This is possible, for example, with the setting shown in FIG. 3 for the first parameter with the assistance of the first color curve $F_1$ and the value range $W_1$ lying next to it. The appertaining transfer function is shown in FIG. 5a. Up to a defined, moderate signal value—normalized here to the values 0 through 4095—the signal value is converted into a blue color value. Above this moderate value, the transfer function $T_1$ rises linearly up to the red region.

Figure 5B:
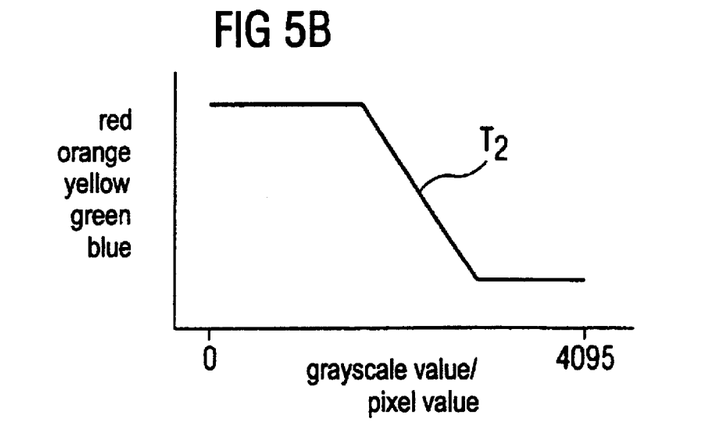
FIG. 5b is an example of a user-defined, first transfer function for a second parameter in accordance with the invention.

For the second parameter, i.e. the signal rise or drop in the late phase $P_2$, the setting in FIG. 3 is selected such that a pronounced negative change (in the value range $W_2$ below −50% here) is correlated with a red color region, since a pronounced signal drop in the second phase $P_2$ indicates a malignant lesion, exactly like an especially pronounced signal rise in the early phase $P_1$. In contrast thereto, a signal rise in the late phase $P_2$ is more likely to lie in the blue or black region since this indicates a benign lesion. The setting of the color curve $F_2$ and of the value range $W_2$ in FIG. 3 generates a transfer function $T_2$ for the second parameter as shown in FIG. 5b. Here as well, the color value is presented via a normalized signal value between 0 and 4095.

In the example shown in FIG. 3, the weighting coefficients $\alpha_1$, $\alpha_2$ are set to 63% for the first parameter and 32% for the second parameter. The setting of this weighting coefficient $\alpha_1$, $\alpha_2$ is at the discretion of the examination personnel and is dependent on the different "school" of the examination personnel in the cited example. Under certain circumstances, thus, some users will weight the two parameters the same, i.e. a weighting coefficient of 0.5 is set for both parameters, in contrast to which other users consider the second parameter, i.e. the drop in the second phase, to be more important and therefore provide this parameter with a higher weighting coefficient than the first parameter.

Figure 5C:
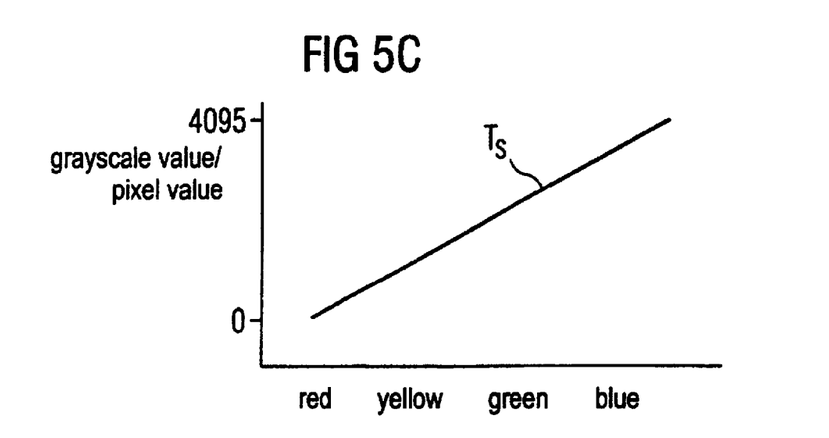
FIG. 5c is an illustration of a standard transfer function defined equally for all parameters as the second transfer function in accordance with the invention.

FIG. 5c, finally, shows a possible standard transfer function $T_s$ for the back-transfer of the color values $RGB_1$, $RGB_2$, $RGB_n$ of the individual parameters into the color-coded intensity values $Ĩ_1$, $Ĩ_2$, $Ĩ_n$. A linear transformation of the color values proceeding from red values via yellow and green up to blue values onto an intensity value between 0 and 4095 is simply implemented with this transfer function.

The invention makes it possible to calculate a result map that assists in enabling a dependable diagnosis very fast from an arbitrary plurality of parameters. In particular, it is thereby possible to define the weighting of the individual parameters as well as the settings of the transfer functions once and prescribe them for further examinations of the same type. The influence of subjective impressions of the examination personnel is thus reduced and an objective criterion in the mixing of the parameters is defined. The evaluation results over a number of examinations as well as the experiences resulting therefrom can be made more dependable and exact and ultimately less dependent on the individual experience of the appertaining user.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for generating a combined parameter map, representing respective values of a combined parameter at all coordinate positions in said combined parameter map, from a plurality of initial parameter maps respectively containing values of individual parameters at respective coordinate positions in the respective initial parameter maps corresponding to said coordinate positions in said combined parameter map, comprising the steps of, for each of said initial parameter maps and for each of said coordinate positions:

defining a first transfer function for a parameter in one of the initial parameter maps and converting a value of said parameter in said one of said initial parameter maps into a first color value using said first transfer function;

converting said first color value into a color code intensity value using a second transfer function;

operating on all color intensity values of the respective individual parameters in the respective initial parameter maps at each of said coordinate positions, to form a combined intensity value for that coordinate position; and converting said combined intensity value into a color code value, using a third transfer function, at each of said coordinate positions in said parameter maps.

2. A method as claimed in claim 1 comprising using an identical second transfer function for all individual parameters in all of said initial parameter maps.

3. A method as claimed in claim 1 wherein the step of operating on said color code intensity values to form said combined intensity value comprises forming an average of the respective color code intensity values for each individual parameter in the respective initial parameter maps.

4. A method as claimed in claim 1 wherein the step of operating on said color code intensity values to form said combined intensity value comprises the steps of:

for each individual parameter, defining a weighting coefficient; and operating on the color code intensity values with the respective weighting coefficients to form said combined intensity value.

5. A method as claimed in claim 1 wherein the step of defining said first transfer function for each individual parameter comprises assigning the value of the individual parameter in the respective initial parameter map a color value dependent on a value range of said value of said individual parameter in the respective initial parameter map.

6. A method as claimed in claim 5 comprising assigning specific color values to specific values of the individual parameter in the initial parameter map, and automatically allocating further values of said individual parameter in the respective initial parameter map, lying between said specific values, to further color values lying between said specific color values.

7. A method as claimed in claim 6 comprising assigning said further color values by interpolation.

8. A method as claimed in claim 5 wherein each individual parameter has an overall value range, and comprising dividing said overall value range into a plurality of sections, and in each of said sections, differently defining said first transfer function for assigning said color value.

9. A method as claimed in claim 8 comprising assigning the respective color values to the values of the individual parameters within said value range using a graphic user interface by displaying a color curve corresponding to said overall value range.

10. A method as claimed in claim 9 comprising displaying said color curve proceeding through a plurality of different color regions, respectively corresponding to said sections.

11. A method as claimed in claim 10 comprising allowing modification, via said graphic user interface, of at least one of said color curve and the value ranges respectively corresponding to said sections.

12. An apparatus for generating a combined parameter map, representing respective values of a combined parameter at all coordinate positions in said combined parameter map, from a plurality of initial parameter maps respectively containing values of individual parameters at respective coordinate positions in the respective initial parameter maps corresponding to said coordinate positions in said combined parameter map, comprising:

a first transfer module that converts a value of a parameter in each of said initial parameter maps at each coordinate position into a first color value using a first transfer function define for that parameter;

a second transfer module that converts said first color value at each coordinate position into a color code intensity value using a second transfer function;

an operation unit that operates on all color intensity values of the respective individual parameters in the respective initial parameter maps at each of said coordinate positions, to form a combined intensity value for that coordinate position; and a third transfer module that converts said combined intensity value into a color code value, using a third transfer function, at each of said coordinate positions in said parameter maps.

13. An apparatus as claimed in claim 12 wherein said second transfer module using an identical second transfer function for all individual parameters in all of said initial parameter maps.

14. An apparatus as claimed in claim 12 wherein said operating unit operates on said color code intensity values to form said combined intensity value by forming an average of the respective color code intensity values for each individual parameter in the respective initial parameter maps.

15. An apparatus as claimed in claim 12 wherein said operation unit operates on said color code intensity values to form said combined intensity value by, for each individual parameter, defining a weighting coefficient, and operating on the color code intensity values with the respective weighting coefficients to form said combined intensity value.

16. An apparatus as claimed in claim 12 wherein an allocation unit for defining said first transfer function for each individual parameter by assigning the value of the individual parameter in the respective initial parameter map a color value dependent on a value range of said value of said individual parameter in the respective initial parameter map.

17. An apparatus as claimed in claim 16 wherein said allocation unit comprises an input unit for assigning specific color values to specific values of the individual parameter in the initial parameter map, and wherein said allocation unit automatically allocates further values of said individual parameter in the respective initial parameter map, lying between said specific values, to further color values lying between said specific color values.

18. An apparatus as claimed in claim 17 wherein said allocation unit assigns said further color values by interpolation.

19. An apparatus as claimed in claim 16 wherein each individual parameter has an overall value range, and wherein said allocation unit comprises a graphic user interface for displaying a color curve corresponding to said overall value range, and wherein said input unit allows interaction divide said overall value range into a plurality of sections, and in each of said sections, differently defining said first transfer function for assigning said color value.

20. An apparatus as claimed in claim 19 wherein said graphic user interface displays said color curve proceeding through a plurality of different color regions, respectively corresponding to said sections.

21. An apparatus as claimed in claim 20 wherein said input unit allows modification, on said graphic user interface, of at least one of said color curve and the value ranges respectively corresponding to said sections.

22. An imaging system comprising:

an image acquisition device configured to interact with a subject to obtain a plurality of images of the subject; and an evaluation device that generates a combined parameter map, representing respective values of a combined parameter at all coordinate positions in said combined parameter map, from a plurality of initial parameter maps respectively obtained from said images containing values of individual parameters at respective coordinate positions in the respective initial parameter maps corresponding to said coordinate positions in said combined parameter map, said evaluation device comprising:

a first transfer module that converts a value of a parameter in each of said initial parameter maps at each coordinate position into a first color value using a first transfer function define for that parameter;

a second transfer module that converts said first color value at each coordinate position into a color code intensity value using a second transfer function;

an operation unit that operates on all color intensity values of the respective individual parameters in the respective initial parameter maps at each of said coordinate positions, to form a combined intensity value for that coordinate position; and a third transfer module that converts said combined intensity value into a color code value, using a third transfer function, at each of said coordinate positions in said parameter maps.

* * * * *